US008681189B2

(12) United States Patent
Wallener et al.

(10) Patent No.: US 8,681,189 B2
(45) Date of Patent: Mar. 25, 2014

(54) SYSTEM AND METHODS FOR APPLYING ADAPTIVE GAMMA IN IMAGE PROCESSING FOR HIGH BRIGHTNESS AND HIGH DYNAMIC RANGE DISPLAYS

(75) Inventors: Damir Wallener, North Vancouver (CA); Lewis Johnson, Delta (CA)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 206 days.

(21) Appl. No.: 13/119,994

(22) PCT Filed: Sep. 17, 2009

(86) PCT No.: PCT/US2009/057248
§ 371 (c)(1),
(2), (4) Date: Mar. 21, 2011

(87) PCT Pub. No.: WO2010/039440
PCT Pub. Date: Apr. 8, 2010

(65) Prior Publication Data

US 2011/0169881 A1 Jul. 14, 2011

Related U.S. Application Data

(60) Provisional application No. 61/101,584, filed on Sep. 30, 2008.

(51) Int. Cl.

| | |
|---|---|
| ***G09G 5/10*** | (2006.01) |
| ***G06F 3/038*** | (2013.01) |
| ***G09G 5/00*** | (2006.01) |
| ***G09G 3/36*** | (2006.01) |

(52) U.S. Cl.
USPC ............... 345/690; 345/204; 345/87; 345/88; 345/89; 345/102

(58) Field of Classification Search
USPC ...................... 345/204, 690, 87–89, 102, 4, 5
See application file for complete search history.

(56) References Cited

U.S. PATENT DOCUMENTS

2002/0171852 A1 11/2002 Zhang
2006/0038807 A1 * 2/2006 Eckhardt et al. .............. 345/207

(Continued)

FOREIGN PATENT DOCUMENTS

EP 1587049 10/2005
EP 1713055 10/2006

(Continued)

OTHER PUBLICATIONS

Seetzen, et al., "High Dynamic Range Display Systems" Proceedings ACM SIGGRAPH, Dec. 9, 2004, pp. 1-9.

(Continued)

*Primary Examiner* — Ilana Spar

(57) ABSTRACT

Systems and methods of image processing are provided for a display having a light source modulation layer and a display modulation layer. A section of a perceptual curve, such as a DICOM curve, is extracted for each frame of image data, based on a profile of expected luminance on the display modulation layer from light emitted by the light source modulation layer. The section of the perceptual curve may be used to determine a desired-total response curve which maps display modulation layer input control values to corresponding output luminance values. The desired-total response curve and a display modulator-specific response curve may be applied to image data to generate control values for driving the display modulation layer.

20 Claims, 6 Drawing Sheets

(56) References Cited

U.S. PATENT DOCUMENTS

| | | | | |
|---|---|---|---|---|
| 2006/0103621 | A1 | 5/2006 | Feng | |
| 2008/0049049 | A1* | 2/2008 | Park et al. | 345/690 |
| 2008/0088649 | A1* | 4/2008 | Ikeno et al. | 345/690 |

FOREIGN PATENT DOCUMENTS

| | | |
|---|---|---|
| JP | 2004159986 | 6/2004 |
| KR | 2006-0103527 | 10/2006 |
| WO | 02069030 | 9/2002 |
| WO | 03077013 | 9/2003 |
| WO | 2004093042 | 10/2004 |
| WO | 2006010244 | 2/2006 |
| WO | 2008010236 | 1/2008 |
| WO | 2008/092276 | 8/2008 |

OTHER PUBLICATIONS

DICOM "Digital Imaging and Communications in Medicine" Part 14: Grayscale Standard Display Function, National Electrical Manufacturers Association Apr. 24, 2006.

* cited by examiner

SYSTEM AND METHODS FOR APPLYING ADAPTIVE GAMMA IN IMAGE PROCESSING FOR HIGH BRIGHTNESS AND HIGH DYNAMIC RANGE DISPLAYS

CROSS-REFERENCE TO RELATED APPLICATIONS

This application claims priority to U.S. Patent Provisional Application No. 61/101,584, filed 30 Sep. 2008, hereby incorporated by reference in its entirety.

TECHNICAL FIELD

This invention relates to systems and methods for processing and/or displaying images. Particular embodiments of the invention may be used to process image data for high brightness and/or high dynamic range (HDR) displays.

BACKGROUND

The voltage response of a display is typically non-linear. For conventional displays, the output luminance Y of a display may be related to an input value (e.g. an applied signal or control value such as input voltage V) by a power function, or gamma curve, as follows:

$$Y \propto V^{\gamma} \tag{1}$$

where the gamma value $\gamma$ (the numerical value of the exponent of the power function) is typically in the range of 1.8 to 3.5, and Y is the luminous intensity per unit area projected in a given direction, typically expressed in cd/m$^2$ or nits. Conventionally, Y may be normalized to 1 relative to the luminance of a white reference which typically corresponds to a maximum luminance for the display (e.g. for a display having a white reference with a luminance of 200 cd/m$^2$, Y=1 refers to a luminance value of 200 cd/m$^2$). Similarly, input values may be normalized to 1 relative to a maximum input value. Normalized luminance values and normalized input values may be referred to as relative luminance values and relative input values, respectively.

The Rec. 709 standard of the International Telecommunication Union (ITU) uses a gamma value of 2.2. To help compensate for the expected voltage response of a display having a gamma value of 2.2, image data may be gamma-encoded or gamma-corrected with the inverse of the gamma value (i.e. encoded with a gamma value of about 1/2.2=0.45). FIG. 1 shows a gamma curve 8 (representing the voltage response of a display) having a gamma value of 2.2 and a gamma-encoding curve 9 having a gamma-encoding value of 1/2.2. As shown in the illustrated example of FIG. 1, if it is desired to display an image element (e.g. a pixel) with Y=0.218, then the original input value of V=0.218 is gamma corrected using gamma-encoding curve 9 to provide a gamma-corrected luminance value $$Y = V^{\frac{1}{\gamma}} = (0.218)^{\frac{1}{2.2}} = 0.5$$

as shown by arrow 6. When it is desired to display the image element, then the display is driven with the corresponding gamma-corrected input value V=0.5. Because of the non-linear display response curve 8, the input value V=0.5 provides the desired output luminance $Y=V^{\gamma}=(0.5)^{2.2}=0.218$ as shown by arrow 7.

For conventional displays which typically have luminance levels of up to approximately 100 to 200 cd/m$^2$, a single power law gamma curve (e.g. of the form of equation (1)) may be used to approximate the non-linear response of the display over its luminance range. At such luminance levels, the human visual system (HVS) perceives light in a non-linear fashion which, by coincidence, is approximately the inverse of the gamma curve of the display.

High brightness and/or high dynamic range (HDR) displays have evolved having a peak luminance as high as approximately 4000 cd/m$^2$ or higher. At luminance levels beyond 200 cd/m$^2$, and approaching 4000 cd/m$^2$ or higher, the simple power law gamma-encoding curves become increasingly unsuitable for the HVS' perception of brightness, as the HVS perceives changes in brightness at higher luminance levels differently than at lower luminance levels.

High brightness and/or HDR displays may incorporate a spatially modulated light source such as those described in PCT Patent Application Publication Nos. WO02/069030, WO03/077013, WO2006/010244 and WO2008/092276. Such displays comprise a light source modulation layer (e.g. a spatially modulated backlight) and a display modulation layer. The light source modulation layer may be driven to produce a comparatively low-resolution representation of an image which is subsequently provided to the display modulation layer. The low-resolution representation is further modulated by the display modulation layer to provide a higher resolution image which is viewed by the observer. The light source modulation layer may comprise a matrix of actively modulated light sources, such as light emitting diodes (LEDs), for example. The display modulation layer, which may be positioned and/or aligned to receive light from the light source modulation layer, may comprise a liquid crystal display (LCD). The brightness of a pixel on the display modulation layer is therefore affected by the variable localized brightness across the light source modulation layer.

Because the light source modulation layer may produce a comparatively low-resolution representation of an image, the expected luminance pattern that will be provided on the display modulation layer when the driving values are applied to the light source modulation layer may be relatively slowly varying at the resolution of the display modulation layer. Therefore, it is possible to compute the expected luminance pattern at a lower resolution, and then to scale the expected luminance pattern up to a desired higher resolution (e.g. such as the resolution of the display modulation layer) without introducing significant artifacts.

The use of dual modulation layers having different resolutions may inhibit a simple one-to-one mapping between image data and output luminance values in a dual modulator display.

There is a general desire for systems and methods to process image data for high brightness and/or HDR displays.

BRIEF DESCRIPTION OF DRAWINGS

In drawings which illustrate non-limiting embodiments of the invention.

DESCRIPTION

Throughout the following description, specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

As discussed above, a conventional display exhibits a non-linear transfer function which can be modeled by a power function (e.g. gamma curve) relating input values (e.g. applied signal or control values such as voltage) to output luminance values. A gamma-encoding curve may be used to encode image data to compensate for the non-linear response of the display. In systems where pixels are represented by RGB triplets, each of the color channels (i.e. each of the R, G and B values) may be independently gamma encoded (i.e. a power law may be used to map input values to output R, G and B values). Also, the HVS perceives light in a non-linear fashion which is approximately the inverse of the power function at the luminance levels of conventional displays. However, the power function approximation for the HVS' perception of brightness breaks down for displays with high dynamic range (HDR displays) or displays with high brightness.

In particular embodiments of the invention, an alternate encoding curve or function may be applied to encode image data instead of a conventional power law gamma-encoding curve. The encoding curve may be ascertained by extracting a portion of a perceptual curve. The portion of the perceptual curve extracted may comprise a subset of the luminance range of the perceptual curve. The portion of the perceptual curve may comprises a subset of the luminance range corresponding to a range of luminance data of a particular frame of image data or to a range of luminance data of a particular subset of a frame of image data. The portion of the perceptual curve may be adjusted to accommodate display-specific calibration information.

Figure 1:
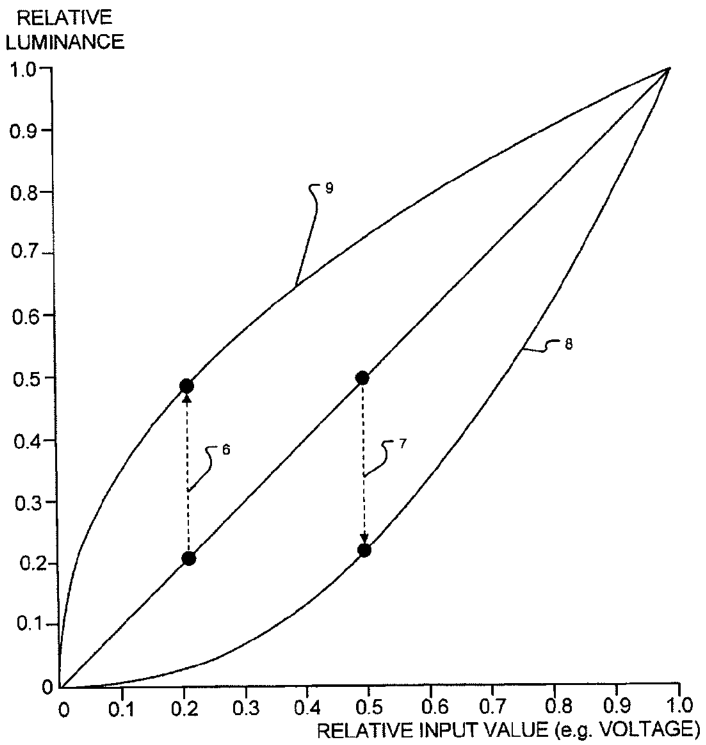
FIG. 1 is a graph of a prior art gamma curve and gamma-encoding curve.
Figure 2A:
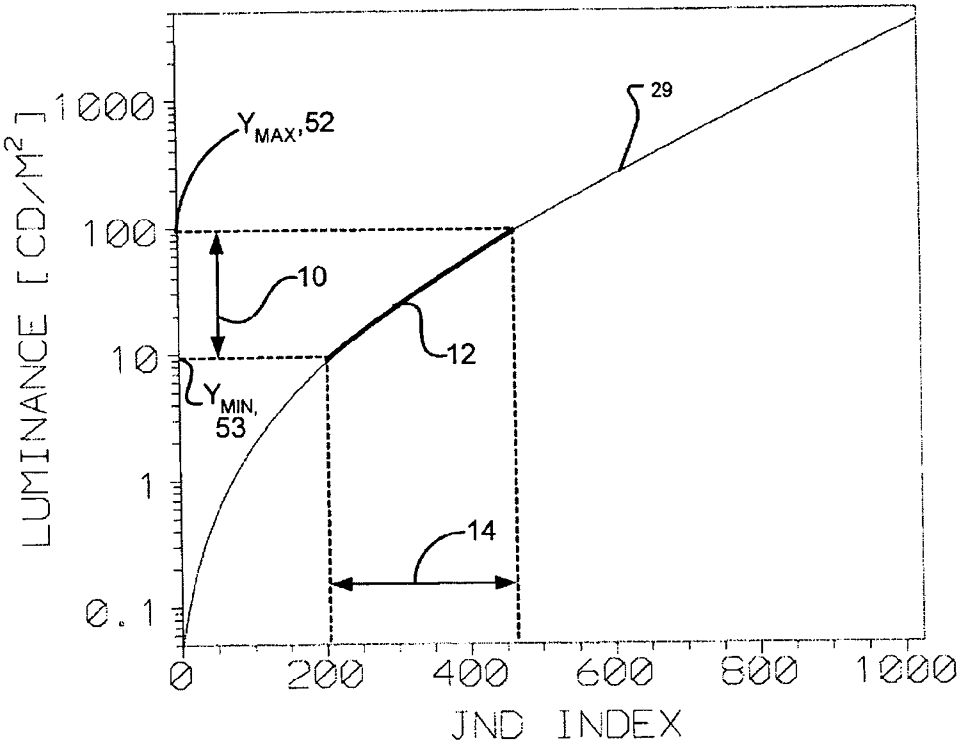
FIG. 2A is a graph of a grayscale standard display curve as defined by the Digital Imaging and Communications in Medicine standard published on the website medical.nema.org, wherein the luminance Y (on the Y-axis) is displayed on a logarithmic scale.
Figure 2B:
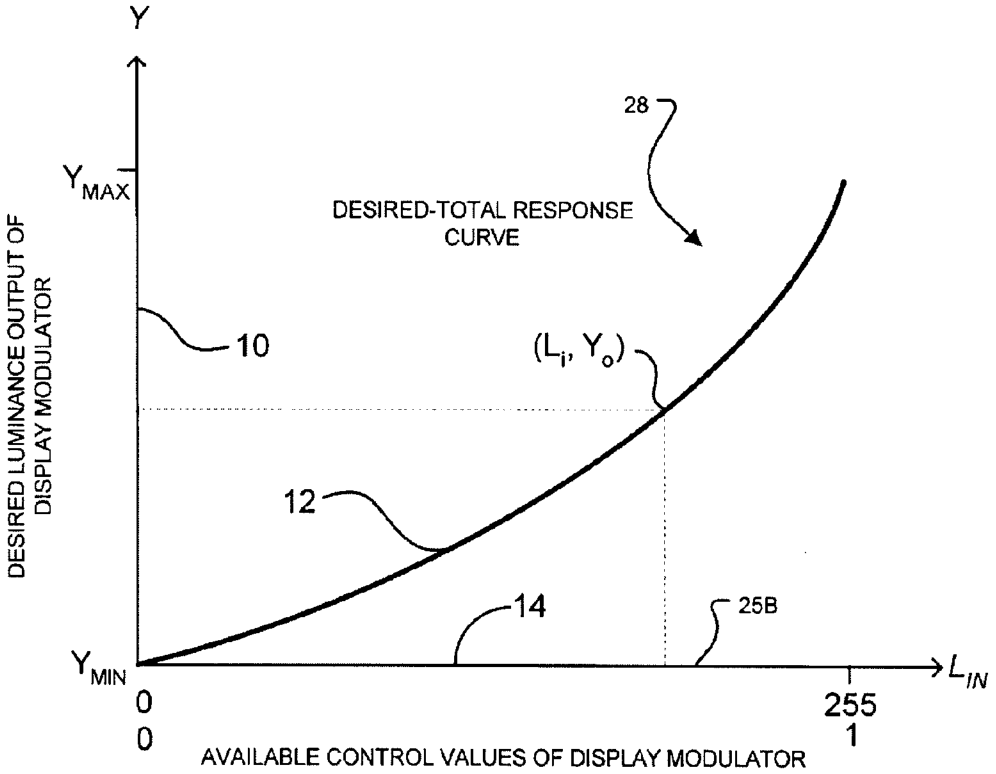
FIG. 2B is a section of the FIG. 2 curve.
Figure 2C:
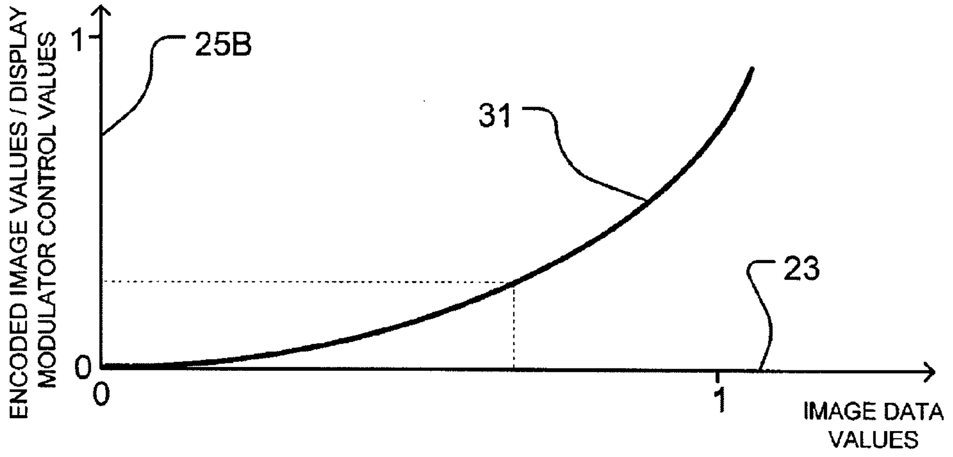
FIG. 2C is a graph of a net transfer function mapping input control values to output control values for a display modulation layer of a dual modulation display.

As used herein, encoding image data refers to the process of applying one or more functions (e.g. mapping(s)) to image data. The encoded image data may in turn be used to provide suitable control values used to drive a display. In particular embodiments, such control values may comprise modulation layer control values which are output to the display modulation layer of a dual modulation display. In one particular embodiment, the perceptual curve used to generate the encoding curve is the Digital Imaging and Communications in Medicine (DICOM) PS 3.14 Grayscale Standard Display Curve (FIG. 2). The DICOM PS 3.14 Grayscale Standard Display Curve (referred to herein as the DICOM curve) is described in Part 14 of the December 2006 publication of the DICOM standard published by the National Electrical Manufacturer's Association which is hereby incorporated herein by reference. The DICOM curve was developed by the DICOM standards committee based on empirical studies of the HVS for the purpose of providing better visual consistency in how images appear on different display devices. Perceptual curves such as the DICOM curve may be used to map between input values (e.g. applied signal or control values of a display, such as input voltages, digital driving levels or the like) and output luminance values or output color channel values. In the specific case of the DICOM perceptual curve, the DICOM curve maps just-noticeable difference (JND) values to output luminance values. An increment of a single JND value represents an increment in an input value (e.g. voltage or digital driving level) for which there is a corresponding change in the luminance of a given display under given viewing conditions that an average human observer can just perceive. The DICOM curve is an example of a perceptual curve which takes into account the HVS' perception of light in assigning a relationship between input values (e.g. JND values and/or display input values) to output luminance values. In other embodiments, other types of curves (which may or may not be perceptual curves) may be used in the place of the DICOM curve to generate an encoding curve.

As illustrated in FIG. 2, the DICOM curve is defined for a luminance range from 0.05-4000 cd/m$^2$ within which there are corresponding JND values in the range from 0-1023 (i.e. [0,2$^{10}$-1]). Conveniently, some high brightness and/or HDR displays also have maximum luminance values in a vicinity of 4000 cd/m$^2$. For some displays, the peak luminance of a display may be user-adjustable (or otherwise adjustable) to a luminance value which is different than 4000 cd/m$^2$. The DICOM curve may be represented by the following analytical function:

$$\log_{10}L(j) = \frac{a + c\,Ln(j) + e(Ln(j))^2 + g(Ln(j))^3 + m(Ln(j))^4}{1 + bLn(j) + d(Ln(j))^2 + f(Ln(j))^3 + h(Ln(j))^4 + k(Ln(j))^5} \quad (2)$$

where Ln is the natural logarithm, j represents the index (1-1023) of the luminance levels $L_j$ of the JNDs and the coefficients are given by: a=−1.3011877, b=−2.5840191E-2, c=8.024636E-2, d=−1.0320229E-1, e=1.3646699E-1, f=2.8745620E-2, g=−2.5468404E-2, h=−3.1978977E-3, k=1.2992634E-4 and m=1.3635334E-3.

At lower luminance levels, a power function response of a display (as represented by equation (1)) may be similar to a DICOM curve. However, at higher luminance levels, the power function will vary from the DICOM curve and/or the HVS response. For example, if one stretches a power function over the luminance range of the DICOM curve (i.e. by plotting a power function from a range of Y=0 to a range of Y=4000 cd/m$^2$), the power function deviates from the DICOM curve at higher luminance levels.

Current conventions for image processing typically use eight bits to represent image luminance (or image data color channels). Such conventions are unable to accommodate a one-to-one mapping of input values to the 1024 available luminance values of the DICOM curve. Ten bits of luminance data are required to represent all of the available output luminance values of the DICOM curve (i.e. to provide a one-to-one mapping between input values and the DICOM luminance values). In addition, the DICOM curve assumes a single peak brightness over the display. However, for dual modulation displays, the light source modulation layer provides spatially modulated light to the display modulation layer, so that peak brightness varies locally across the display modulation layer. Moreover, in some dual modulation displays, the light source modulation layer has a resolution different from the display modulation layer, which inhibits a one-to-one mapping between image data and output luminance values.

According to particular embodiments of the invention, a section of a perceptual curve, such as a DICOM curve, is extracted for each frame of image data, based on the expected luminance range of the frame. The section of the perceptual curve may be used to map luminance values (or other pixel values (e.g. R, G and B pixel values)) over the luminance range of the frame to the available control values for the display. The mapping determined in this manner may represent a desired-total response curve. For a particular display, display-specific calibration data may be obtained or determined to relate display modulator drive values to display modulator output. Display-specific calibration data may be obtained or determined for each color channel. An encoding curve or encoding mapping function may be obtained by adjusting the desired-total response curve to incorporate the known display-specific calibration data. That is, an encoding curve may be obtained from the desired-total response curve by pre-adjusting the desired-total response curve such that application of the encoding curve to the image data and then application of the resultant encoded image data to the display modulation layer will result in the desired-total response. The encoding curve obtained in this manner may be used to encode image data (i.e. to determine control values for driving a display). The encoding curve may be applied to individual color channels.

In some embodiments, where the image data is displayed on a dual modulation display, the encoding of image data determines display modulator control values which may be used to drive the pixels of the display modulation layer. In some embodiments, the encoding process may be applied to subsections of an image frame. In some embodiments, the perceptual curve may be pre-calibrated by adjusting the perceptual curve to accommodate the display-specific response. In this manner, the encoding curve may be obtained directly from a section of the pre-calibrated perceptual curve.

Figure 6:
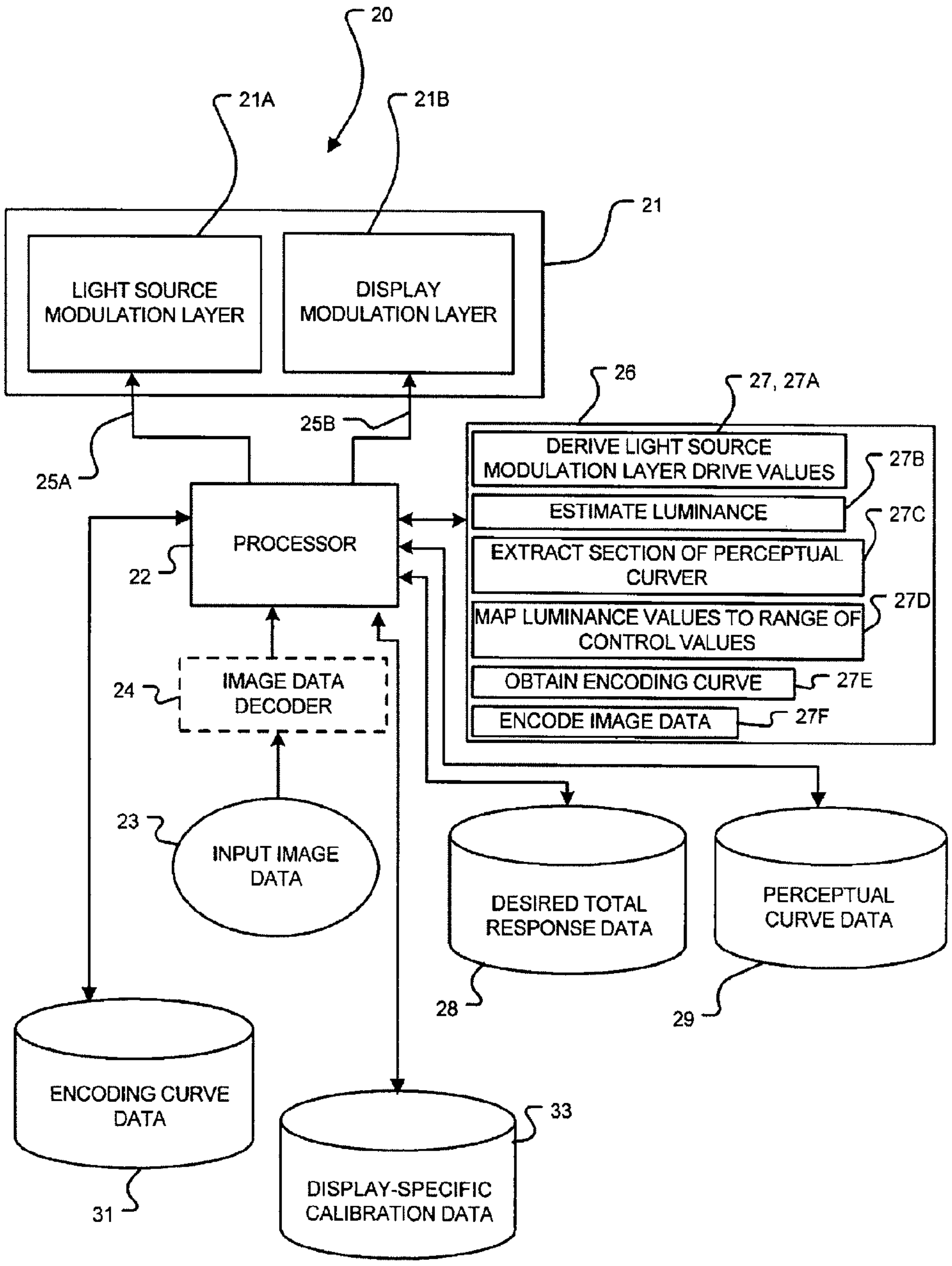
FIG. 6 schematically illustrates a system that may be used to implement the methods of FIGS. 3, 4 and 5.

FIG. 6 shows a dual modulation display system 20 according to a particular embodiment of the invention. Display system 20 may operate to display image data 23. Display system 20 may be configured to perform the methods of the invention. Display system 20 comprises a display 21, such as a high brightness and/or HDR display. In the illustrated embodiment, display 21 comprises a dual modulation display having a light source modulation layer 21A and a display modulation layer 21B.

System 20 also comprises a processor 22, which may comprise a central processing unit (CPU), one or more microprocessors, one or more FPGAs or any other suitable processing unit(s) comprising hardware and/or software capable of functioning as described herein. Processor 22 processes image data 23 to generate light source modulator control values 25A to drive the light source modulation layer 21A, and display modulator control values 25B to drive the display modulation layer 21B. In particular embodiments, light source modulation layer 21A comprises a matrix of LEDs. In such embodiments, control values 25A provided to light source modulation layer 21A may comprise digital LED drive values which may be converted to analog LED drive values (e.g. voltages). In some embodiments, display modulation layer 21B comprises an array of LCD pixels. In such embodiments, control values 25B provided to display modulation layer 21B may comprise corresponding LCD pixel drive values, which may be converted to analog LCD drive values.

In some embodiments, image data 23 has already been encoded according to a conventional gamma-encoding scheme. In such embodiments, system 20 may comprise an optional image data decoder 24 to decode or otherwise linearize image data 23 prior to (or as a part of) processing by processor 22. While image data decoder 24 is shown a separate component for clarity, this is not necessary. In other embodiments, image data decoder 24 may be implemented by processor 22 which may execute suitable software instructions stored in program memory 26 or other suitable memory location.

Processor 22 may implement methods according to embodiments of the invention by executing software instructions provided by software functions 27. In the illustrated embodiment, software functions 27 are stored in a program memory 26, but this is not necessary and software functions 27 may be stored in other suitable memory locations within or accessible to processor 22. In some embodiments, portions of software functions 27 may alternatively be implemented by suitably configured hardware. Processor 22 also has access to perceptual curve data 29 which, as shown in the illustrated embodiment, may be stored in a suitable data store. Perceptual curve data 29 may comprise information corresponding a DICOM curve or another perceptual curve used for mapping input values to output luminance values. In the illustrated embodiment, processor 22 also has access to a display-specific calibration data 33, which may be stored in a suitable data store. Calibration data 33 may relate the output of display 21 to drive values 25B of display modulation layer 21B. In the illustrated embodiment and as explained in more detail below, processor 22 generates a desired-total response curve 28 and an encoding curve 31, which may be stored in suitable data store(s). Perceptual curve data 29, display-specific calibration data 33, desired-total response curve data 28 and/or encoding curve data 31 may be provided in the form of look up table(s) (LUT(s)).

Figure 3:
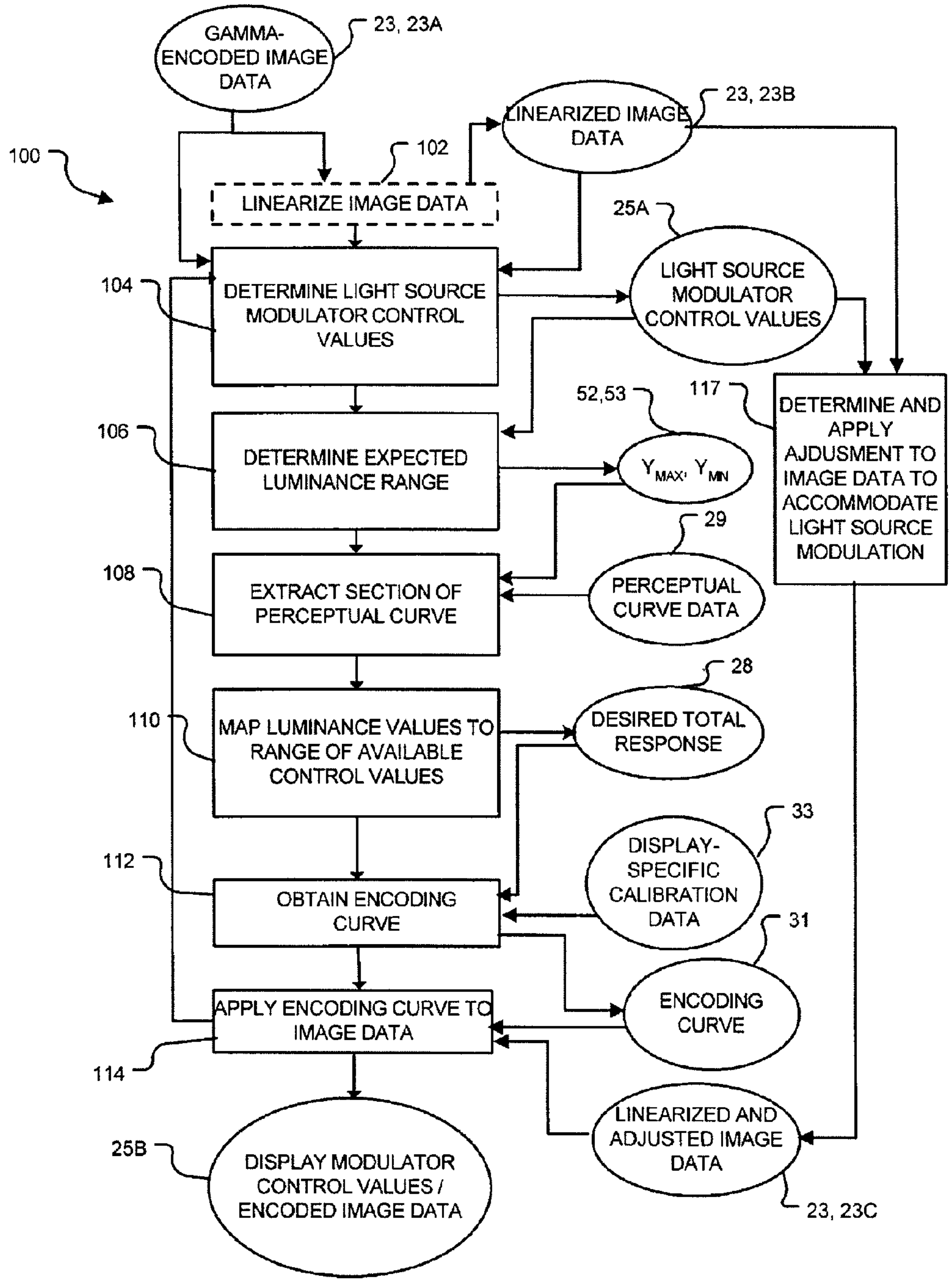
FIG. 3 is a flow chart of a method according to one example embodiment of the invention.

FIG. 3 illustrates a method 100 for encoding and/or displaying image data 23 according to a particular embodiment of the invention. Method 100 may be implemented by display system 20 for display on dual modulation display 21 (FIG. 6). Method 100 may be implemented by other suitable image processing hardware and/or software. The illustrated method 100 represents a method for processing and displaying a single frame of image data 23. Method 100 may be repeated for processing and/or displaying multiple frames of image data 23.

Method 100 begins by receiving a frame of image data 23. Image data 23 may comprise non-linearly encoded data 23A (e.g. conventionally gamma-encoded data 23A) or linear-encoded data 23B, for example. If image data 23 is gamma-encoded or otherwise non-linearly encoded image data 23A when it is received, then the non-linearly encoded image data 23A may optionally be linearized at block 102 to provide linearized image data 23B. Image data 23 (either non-linearly encoded 23A or linearized 23B) is received at block 104. Block 104 involves using image data 23 to determine appropriate control values 25A for light source modulation layer 21A (e.g. LED drive values). The block 104 procedure for obtaining light source modulation layer control values 25A may involve using suitable techniques known to persons in the art. Such block 104 techniques may involve nearest neighbor interpolation or the like and may be based on factors such as intensity or color of image data 23. Block 104 may be performed by processor 22 implementing a suitable software function 27A (FIG. 6).

Method 100 then proceeds to block 106 which involves determining information about the expected luminance profile received at display modulation layer 21B via light source modulation layer 21A. The block 106 determination may be based at least in part on the block 104 light source modulation layer control values 25A. By way of non-limiting examples, methods for determining expected luminance received at display modulation layer 21B are described in PCT Publication Nos. WO03/077013, WO2006/010244 and WO2008/092276, which are hereby incorporated herein by reference. Block 106 may be performed by processor 22 implementing a suitable software function 27B (FIG. 6).

In particular embodiments, block 106 involves using the light source modulation layer control values 25A to estimate a maximum luminance value 52 ($Y_{MAX}$) and a minimum luminance value 53 ($Y_{MIN}$) of the expected luminance profile for a particular frame of image data 23 or a particular subsection of a frame of image data 23. The minimum and maximum luminances $Y_{MIN}$, $Y_{MAX}$ may be used in block 108 to extract a corresponding section 12 from a perceptual curve 29 (e.g. DICOM curve). A particular example of the block 108 procedure for extracting a section 12 from perceptual curve 29 is shown in FIGS. 2 and 2A. In the illustrated example, image data 23 is determined (in block 106) to have a luminance range 10 with a maximum luminance value 52 ($Y_{MAX}\approx 100$ cd/m$^2$) and a minimum luminance value 53 ($Y_{MIN}\approx 10$ cd/m$^2$). Accordingly, section 12 of perceptual curve 29 extracted in block 108 is the section of perceptual curve 29 between $Y_{MIN}\approx 10$ cd/m$^2$ and $Y_{MAX}\approx 100$ cd/m$^2$, as shown in FIG. 2A.

Mapping values corresponding to section 12 of perceptual curve 29 over luminance range 10 may be calculated using an analytical function (e.g. the DICOM analytical function of equation (2)) or they may be extracted from a suitable LUT which may be accessible to processor 22. Block 108 may be performed by processor 22 implementing a suitable software function 27C (FIG. 6). For the purposes of describing the remainder of method 100, it is assumed, without limiting the generality of the method, that section 12 of the FIG. 2, 2A perceptual curve 29 is extracted at block 108.

Referring to FIG. 2, section 12 of perceptual curve 29 has a luminance range 10 and an associated control value range 14 (e.g. a range 14 of JND values in the case of DICOM curve 29). Block 110 involves scaling, offsetting and/or otherwise mapping this range 14 of control values across the available range of display modulator control values 25B corresponding to display modulation layer 21B. For example as shown in FIG. 2A, if display modulator control values 25B for a particular display modulation layer 21B are represented by 8 bits (i.e. [0,255]), then block 110 may involve mapping the control value range 14 of section 12 of perceptual curve 29 into the range [0,255] and assigning each of the available display modulator control values 25B in the range [0,255] a corresponding luminance value Y over luminance range 10 (e.g. between $Y_{MIN}\approx 10$ cd/m$^2$ and $Y_{MAX}\approx 100$ cd/m$^2$ in the case of the illustrated example). The block 110 mapping may involve suitable interpolation techniques or similar mathematical techniques to stretch section 12 of perceptual curve 29. The block 110 mapping may involve suitable downsampling techniques or similar mathematical techniques to compress section 12 of perceptual curve 29 if required. Preferably, the block 110 mapping preserves the shape of section 12 of perceptual curve 29. Block 110 may be performed by processor 22 implementing a suitable software function 27D (FIG. 6).

The output of the block 110 mapping, a particular example of which is shown in FIG. 2A, is a curve representing a relationship between: (i) the available display modulator control values 25B of a particular display modulation layer 21B (as represented by the variable $L_{IN}$ on the abscissa (x-axis) of the illustrated curve); and (ii) desired luminance values (as represented by the variable Y on the ordinate (y-axis) of the illustrated curve) in a luminance range 10 between the block 106 minimum and maximum luminance values ($Y_{MIN}$, $Y_{MAX}$). The block 110 curve may be referred to herein as a desired-total response curve 28 for the frame of image data 23. The values for the block 110 mapping may be retrieved from a LUT or calculated using an analytical function representing perceptual curve 29. As part of block 110, desired-total response curve 28 may be normalized, such that its x-axis values and/or its y-axis values range from [0,1]. Normalization may involve scaling and, in some cases, offsetting. For example, if the available display modulator control values 25B on the x-axis of desired-total response curve 28 range from [0,255], the display modulator control values 25B of desired-total response curve 28 may be normalized by dividing (i.e. scaling) by 255.

Desired-total response curve 28 output from block 110 represents the desired mapping between display modulator control values 25B ($L_{IN}$) and the output luminance values (Y). However, each individual display modulation layer 21B on which method 100 is performed will have its own (typically non-linear) response which relates its own specific output to input display modulator control values 25B ($L_{IN}$). The response of a particular display modulation layer 21B may be represented by display-specific calibration data 33. By way of non-limiting example, display-specific calibration data 33 may comprise a LUT relating display modulator control values 25B ($L_{IN}$) to corresponding output values or corresponding fractional output values for a particular display modulation layer 21B. Fractional output values that make up display-specific calibration data 33 may comprise a fraction of a desired response or of a linear response, for example. In particular embodiments, display-specific calibration data 33 may be provided for each color channel or each tristimulus channel. In other embodiments, display-specific calibration data 33 may be provided as some combination of color channels or tristimulus channels.

In one particular non-limiting example, display-specific calibration data 33 may be obtained by applying known driving signals to light source modulation layer 25A and then varying display modulator control values 25B to display modulation layer 21B while ascertaining the corresponding output of display 21. As will be appreciated by those skilled in the art, there are a wide variety of techniques that can be use to obtain calibration information 33 about display modulation layer 21B.

Block 112 involves modifying desired-total response curve 28 to accommodate display-specific variation (as represented by display-specific calibration data 33) and to thereby generate an encoding curve 31. An example of an encoding curve 31 is show in FIG. 2B. In the illustrated embodiment, encoding curve 31 relates image data values (on the x-axis) to encoded image values (on the y-axis). Encoded image values (on the y-axis of encoding curve 31) may comprise (or may be used to generate) display modulator control values 25B. In the illustrated embodiment of FIG. 2B, encoding curve 31 is normalized, such that it ranges from [0,1] on both its x and y axes.

In the illustrated embodiment, block 112 involves obtaining encoding curve 31 by incorporating the effect of display-specific calibration data 33 into desired-total response curve 28. More particularly, block 112 may involve generating an encoding curve 31 such that application of encoding curve 31 to image data 23 and then application of the resultant encoded image data (i.e. display modulator control values 25B) to a particular display modulation layer 21B will result in a desired output luminance predicted by desired-total response curve 28. In some embodiments, display-specific calibration data 33 is obtained or otherwise available for each color channel or each tristimulus channel, in which case, block 112 may involve obtaining an encoding curve 31 for each color channel or each tristimulus channel. Block 112 may be performed by processor 22 implementing a suitable software function 27E (FIG. 6).

In dual modulator displays such as display 21 of dual modulator display system 20 (FIG. 6), the light received at display modulation layer 21B is spatially varying due to light source modulation layer 21A. As such, image data 23 may be adjusted in block 117 to accommodate for this spatially varying light pattern. The block 117 process may involve simulating or modeling the light received at each pixel or group of pixels in display modulation layer 21B and scaling (or otherwise adjusting) image data 23 corresponding to each pixel or group of pixels to account for the amount of light expected to be received. Various techniques for implementing the block 117 process of adjusting image data 23 to accommodate the spatial variation of light introduced by light source modulation layer 21A are described in PCT Publication Nos. WO03/077013, WO2006/010244 and WO2008/092276. In the illustrated embodiment, the block 117 process is performed on linearized image data 23B and the result is adjusted and linearized image data 23C.

Block 114 involves applying encoding curve 31 to image data 23. In the illustrated embodiment, encoding curve 31 is applied to adjusted and linearized image data 23C output from block 117. As discussed above, application of encoding curve 31 to image data 23C may involve mapping image data 23C to provide encoded image data values which may comprise (or may be used to generate) display modulator control values 25B. Display modulator control values 25B may be output to display modulation layer 21B. In some embodiments, there is an encoding curve 31 for each color channel or each tristimulus channel and block 114 may involve applying an encoding curve 31 to each color channel or tristimulus channel of adjusted and linearized image data 23C. In other embodiments, a single encoding curve 31 may be applied in all color or tristimulus channels. In some embodiments, block 114 involves applying encoding curve 31 to luminance values and then converting the adjusted luminance values back to color channel values if required. The result of the block 114 process is a set of display modulator control values (encoded image data) 25B which may be used to drive the pixels of display modulation layer 21B. Block 114 may be performed by processor 22 implementing a suitable software function 27F (FIG. 6).

Displaying a frame of image data 23 on display 21 (FIG. 6) may then involve outputting light source modulator values 25A to light source modulation layer 21A and display modulator control values 25B to display modulation layer 21B.

Figure 4:
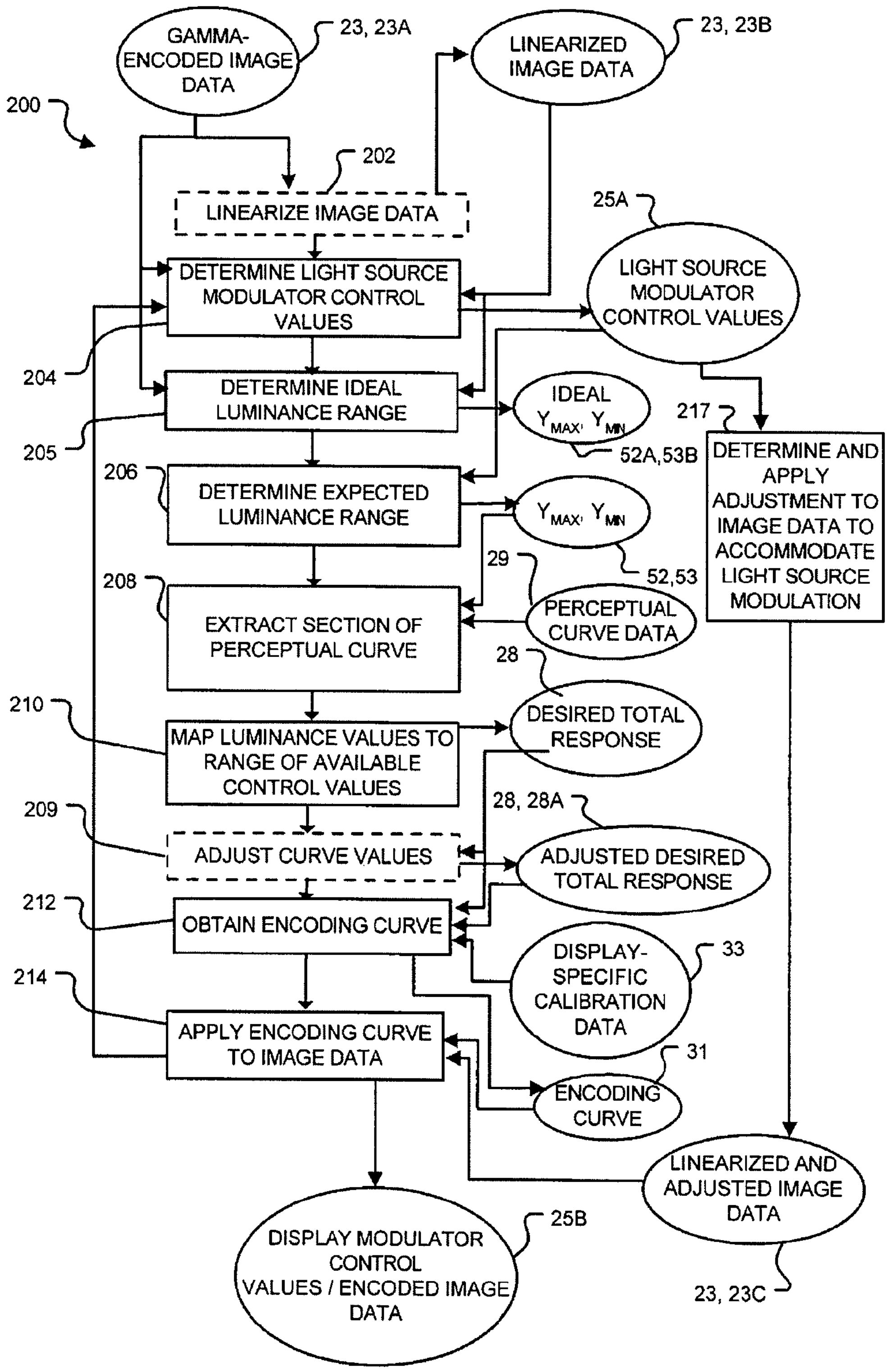
FIG. 4 is a flow chart of a method according to another example embodiment of the invention.

FIG. 4 illustrates a method 200 for encoding and/or displaying image data 23 according to another embodiment of the invention. Method 200 may be implemented by display system 20 for display on dual modulation display 21 (FIG. 6). The illustrated view of method 200 represents a method for processing and displaying a single frame of image data 23. Method 200 may be repeated for processing and displaying multiple frames of image data 23. Method 200 is similar in some respects to method 100. Aspects method 200 that are the same or similar to aspects of method 100 are ascribed similar reference numerals, except that in method 200, the reference numerals are prefixed with a "2" instead of a "1".

Method 200 begins by receiving a frame of image data 23. Image data 23 may comprise non-linearly encoded image data 23A (e.g. conventionally gamma-encoded image data) or linear-encoded image data 23B. To the extent required, non-linearly encoded image data 23A may be linearized in block 202 to provide linearized image data 23B. At block 204, appropriate control values 25A for light source modulation layer 21A (e.g. LED drive values) may be generated from either gamma-encoded data 23A or linearized data 23B. Block 205 involves using non-linearly encoded image data 23A or linearized image data 23B to determine an ideal luminance profile to be provided to display modulation layer 21B. The block 205 ideal luminance profile may involve disregarding the limitations of light source modulation layer 21A. By way of non-limiting example, block 205 may involve an assumption that the resolution of light source modulation layer 21A is the same as the resolution of display modulation layer 21B—i.e. as if each pixel of display modulation layer 21B had its own independent light source. The result of block 205 is idealized minimum and maximum luminances 52A, 53A (IDEAL $Y_{MIN}$, IDEAL $Y_{MAX}$). Block 206 involves determining the profile of the expected luminance on display modulation layer 21B from the light emitted by light source modulation layer 21A (taking into account the intrinsic limitations of the light source modulation layer 21A). Block 206 may be substantially similar to block 106 and result in expected minimum and maximum luminances 52, 53 ($Y_{MIN}$, $Y_{MAX}$). The block 206 determination may be based at least in part on the block 204 light source modulation layer control values 25A.

Block 208 involves extracting a corresponding section 12 of perceptual curve 29 (e.g. a DICOM curve) based on the block 205 idealized minimum and maximum luminance values 52A, 53A (IDEAL $Y_{MIN}$, IDEAL $Y_{MAX}$). Block 208 may be substantially similar to block 108 described above, except that idealized minimum and maximum luminance values 52A, 53A (IDEAL $Y_{MIN}$, IDEAL $Y_{MAX}$) are used instead of the expected minimum and maximum luminance values 52, 53 ($Y_{MIN}$, $Y_{MAX}$).

In block 210, the extracted section 12 of perceptual curve 29 is mapped to the available range of display modulator control values 25B corresponding to display modulation layer 21B. Block 210 may be substantially similar to block 110 described above. The mapping determined at block 210 represents a desired-total response curve 28 for the frame of image data 23.

Block 209 involves optional adjustment of the block 210 desired total response curve 28 to provide an adjusted desired-total response curve 28A. The block 209 adjustment to desired total response curve 28 may involve eliminating spurious results that may have resulted from the use of idealized luminance values 52A, 53A (IDEAL $Y_{MIN}$, IDEAL $Y_{MAX}$) to extract section 12 of perceptual curve 29 in block 208. The block 209 process of adjusting the block 210 mapping may be based on the differences between idealized minimum and maximum luminance values 52A, 53A (IDEAL $Y_{MIN}$, IDEAL $Y_{MAX}$ obtained in block 205 and the expected minimum and maximum luminance values 52, 53 ($Y_{MIN}$, $Y_{MAX}$) obtained in block 206. For example, if these differences exceed a threshold value, the values of the block 210 desired-total response curve 28 may be adjusted to reduce the differences (e.g. by stretching or compressing the desired-total response curve 28 over the luminance ranges of the idealized or expected luminance profiles). If these differences do not exceed a threshold value, the block 210 desired-total response curve 28 may not need adjustment.

Once desired-total response curve 28 is obtained in block 210, and, optionally, subjected to adjustment in block 209, method 200 proceeds to blocks 212 and 214 which involve generating an encoding curve 31 based on desired-total response curve 28, 28A and display-specific calibration information 33 and then applying encoding curve 31 to linearized and adjusted image data 23C to generate encoded image data (i.e. display modulator drive values 25B). Blocks 212, 214, 217 may be substantially similar to blocks 112, 114, 117 described above. Light source modulator drive values 25A obtained in blocks 204 and display modulator control values 25B obtained in block 214 may be provided to light source modulator 21A and display modulator 21B to display an image on display 21.

Figure 5:
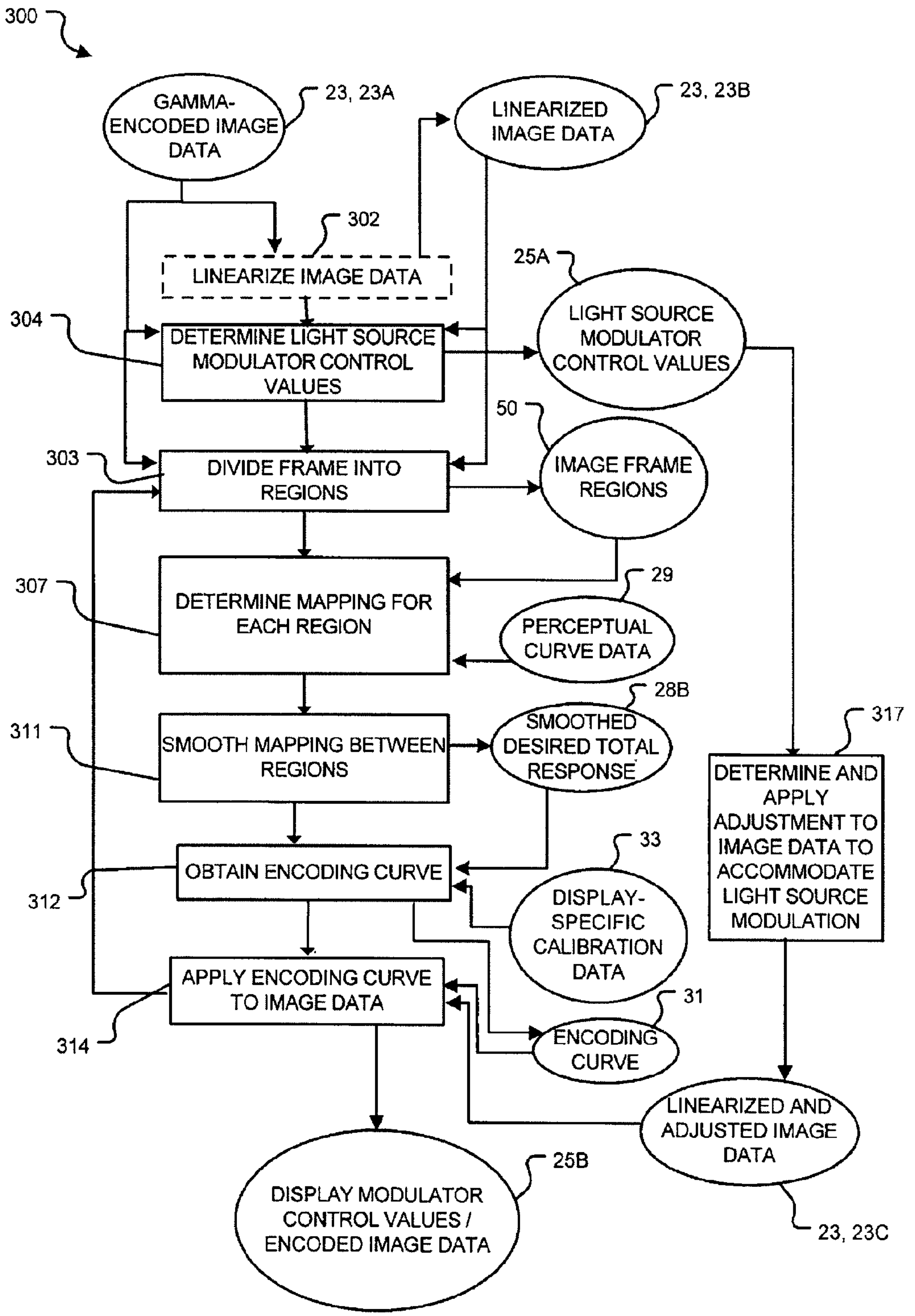
FIG. 5 is a flow chart of a method according to yet another example embodiment of the invention.

FIG. 5 illustrates a method 300 for encoding and/or displaying image data 23 according to yet another embodiment of the invention. Method 300 may be implemented by display system 20 for display on dual modulation display 21 (FIG. 6). The illustrated method 300 represents a method for processing and displaying a single frame of image data 23. Method 300 may be repeated for processing and displaying multiple frames of image data 23. Method 300 is similar in some respects to method 100. Aspects method 300 that are the same or similar to aspects of method 100 are ascribed similar reference numerals, except that in method 300, the reference numerals are prefixed with a "3" instead of a "1".

Method 300 begins by receiving a frame of image data 23 which may be linearized in block 302 (if required) to provide linearized image data 23B. Block 304 involves determining light source modulator control values 25A for the frame of image data 23. Block 304 may be substantially similar to block 104 described above. Method 300 then proceeds to block 303 which involves dividing the frame of image data 23 into multiple regions 50, each region 50 comprising a subset of image data 23 for the particular frame. The block 303 regions 50 may comprise any suitable subsets of a frame of image data 23. For example, the image frame may be divided into M rows, each row having N regions, for a total of M×N regions 50 per frame.

At block 307, a mapping is determined for each region 50. For each region 50, the block 307 mapping may be similar to FIG. 2A and may relate display modulation layer control values 25B (as represented by $L_{IN}$ on the x-axis of FIG. 2A) to output luminance values (as represented by Y on the y-axis of FIG. 2A). In some embodiments, block 307 may involve, for each region 50, implementing steps similar to those of blocks 106 to 110 of method 100 (FIG. 3) or similar to those of blocks 205 to 210 of method 200 (FIG. 4). After the block 307 mapping is determined for each region 50, a smoothing operation (e.g. bilinear interpolation, filtering or other suitable smoothing technique(s)) may be performed between regions 50 in block 311 to determine a smoothed desired-total response curve 28B. Smoothed desired-response curve 28B may comprise a desired-response curve for the entire frame of image data 23 or may comprise a plurality of frame-specific desired-response curves. The block 311 smoothing operation may serve to eliminate discontinuities in the block 307 mapping between regions 50. Once smoothed desired-total response curve 28B is obtained in block 311, method 300 proceeds to obtain an encoding curve 31 by incorporating display-specific calibration information 33 (block 312) and to apply encoding curve 31 to linearized and adjusted image data 23C to obtain encoded image data/display modulator control values 25B (block 314). Blocks 312, 314 and 317 may be substantially similar to blocks 112, 114 and 117 described above. Light source modulator drive values 25A obtained in blocks 304 and display modulator control values 25B obtained in block 314 may be provided to light source modulator 21A and display modulator 21B to display an image on display 21.

As seen in FIG. 6, display system 20 may be configured to perform a method according to the invention. In the illustrated embodiment, processor 22 calls software functions 27, such as function 27A to derive light source modulation layer control values (e.g. LED drive values), function 27B to estimate the luminance on display modulation layer 21B, function 27C to extract a section 12 of a perceptual curve 29, function 27D to determine a mapping between extracted curve section 12 and display modulator control values 25B, function 27E to obtain an encoding curve 31 by incorporating calibration information 33 and function 27F to encode image data 23 using encoding curve 31 to determine control values 25B for driving pixels of display modulation layer 21B.

In some embodiments, functions 27 may be implemented as software contained in a program memory 26 accessible to processor 22. Processor 22 may implement the methods of FIG. 3, 4 or 5 by executing software instructions provided by the software contained in program memory 26. In other embodiments, one or more of functions 27 or portions of functions 27 may be performed by suitably configured data processing hardware.

Aspects of the invention may also be provided in the form of a program product. The program product may comprise any medium which carries a set of computer-readable information comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable information on the program product may optionally be compressed or encrypted.

Where a component (e.g. a device, processor, LED, LCD, light source modulation layer, display modulation layer, display, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

As will be apparent to those skilled in the art in light of the foregoing disclosure, many alterations and modifications are possible in the practice of this invention without departing from the spirit or scope thereof. For example:

The methods described herein may be applied to still image data (e.g. as taken from still cameras).

Examples are provided above, wherein display modulator control values 25B are described as having a range [0,255] provide by eight bits. This is not necessary. In general, display modulator control values 25B may comprise any suitable bit depth.

Other suitable curves (which may be perceptual or non-perceptual) may be used instead of the DICOM curve to map display modulation layer control values to output luminance values.

In the above-described embodiments, a separate procedure adjusts desired-total response curve 28 to incorporate display-specific calibration information 33 and to thereby obtain encoding curve 31 (see, for example, block 112 described above). While useful for illustrative purposes, this is not necessary. In some embodiments, display-specific calibration information 33 may be pre-incorporated into perceptual curve 29, such that section 12 of perceptual curve 29 extracted (e.g. in block 108) and mapped (e.g. in block 110) to the available range of display modulation layer control values 25B is a display-specific total-desired response curve. By way of non-limiting example, several pre-calibrated perceptual curves may be provided for different luminance ranges and a particular one of the pre-calibrated perceptual curve may be selected based on expected luminance values (e.g. $Y_{MAX}$, $Y_{MIN}$ or the like).

In the embodiments described above, the extracted curve section of the perceptual curve is based on estimates of both the minimum and maximum expected or ideal luminance values (e.g. $Y_{MIN}$, $Y_{MAX}$) and is determined on the basis of light source modulator control values 25A. In some embodiments, estimation of the minimum luminance value ($Y_{MIN}$) may be fixed (e.g. the estimated value of the expected or ideal minimum luminance ($Y_{MIN}$) may be set to $Y_{MIN}=0$ or $Y_{MIN}$ equal to some other suitable constant).

In the embodiments described above, the methods for displaying images are described in relation to dual modulator displays, a particular example of which is shown in FIG. 6. In other embodiments, the invention could be practiced on displays which have only a single modulator, but which have so-called "brightness" control (e.g. a user configurable brightness input). In such embodiments, extraction of the corresponding section of the perceptual curve may be based on estimating minimum and maximum expected luminance values (e.g. $Y_{MIN}$, $Y_{MAX}$) corresponding to a particular setting of the brightness control. The extracted section of the perceptual curve may then be mapped to the available range of display modulator control values, calibrated to generate an encoding curve and applied to the image data to generate display modulator control values in a manner similar to the embodiments described above.

In light of all of the foregoing, this invention has many aspects. These aspects include, without limitation, the following:

The invention claimed is:

1. A method for displaying an image on a display having a light source modulation layer and a display modulation layer, the method comprising:

receiving a frame of image data;

determining light source modulator control values for the light source modulation layer, based at least on the image data;

estimating a minimum and maximum luminance received at the display modulation layer;

extracting a section of a perceptual curve that maps luminance values to display modulator control values, the extracted section of the perceptual curve having luminance values extending between the estimated minimum and maximum luminance;

mapping the luminance values of the extracted section of the perceptual curve to an available range of display modulator control values for the display modulation layer to determine a desired-total response curve;

determining display modulator control values for the display modulation layer based at least on the image data and the desired-total response curve;

displaying the image by outputting the display modulator control values to the display modulation layer and the light source modulator control values to the light source modulation layer; and obtaining calibration data which relates display modulator control values to corresponding output of the display modulation layer;

wherein determining display modulator control values is based at least on the calibration data; and wherein determining display modulator control values comprises: adjusting the desired-total response curve based on the calibration data to obtain an encoding curve which relates input image data values to output display modulator control values; and applying the encoding curve to the image data to obtain the display modulator control values used to display the image.

2. A method according to claim 1 comprising representing the calibration data as a look up table in memory accessible to the display.

3. A method according to claim 1 comprising representing the encoding curve as a look up table in memory accessible to the display.

4. A method according to claim 1 wherein each of the estimated minimum and maximum luminance is an expected luminance based at least on the light source modulator control values.

5. A method according to claim 1 wherein each of the estimated minimum and maximum luminance is an ideal luminance based at least on the image data.

6. A method according to claim 5 wherein estimating the minimum and maximum ideal luminance involves assuming that the light source modulation layer and the display modulation layer have the same resolution.

7. A method according to claim 5 wherein estimating the minimum and maximum ideal luminance involves assuming that each element of the light source modulation layer is independent of the other elements of the light source modulation layer.

8. A method according to claim 5 comprising performing a validity check on at least one of the display modulator control values and the desired-total response curve to ensure that use of the minimum and maximum ideal luminance did not lead to any spurious results.

9. A method according to claim 1, wherein the received frame of image data is divided into regions;

wherein the method is performed for each region; and wherein the desired-total response curve is adjusted at boundaries between regions to reduce discontinuities between adjacent regions.

10. A method according to claim 1, the display further having a brightness control, wherein each of the estimated minimum and maximum luminance is an expected luminance based at least on the brightness control.

11. A method for displaying an image on a display having a light source modulation layer and a display modulation layer, the method comprising:

receiving a frame of image data;

determining light source modulator control values for the light source modulation layer, based at least on the image data;

estimating a minimum and maximum luminance received at the display modulation layer;

extracting a section of a perceptual curve that maps luminance values to display modulator control values, the extracted section of the perceptual curve having luminance values extending between the estimated minimum and maximum luminance;

mapping the luminance values of the extracted section of the perceptual curve to an available range of display modulator control values for the display modulation layer to determine a desired-total response curve;

determining display modulator control values for the display modulation layer based at least on the image data and the desired-total response curve; and displaying the image by outputting the display modulator control values to the display modulation layer and the light source modulator control values to the light source modulation layer;

wherein mapping the extracted section of the perceptual curve to the available range of display modulator control values comprises using interpolation to stretch the extracted section of the curve.

12. A method according to claim 11 wherein mapping the extracted section of the perceptual curve to the available range of display modulator control values comprises applying an offset to the extracted section of the perceptual curve.

13. A method according to claim 11 wherein the perceptual curve is pre-calibrated to take into account calibration data which relates display modulator control values to corresponding output of the display modulation layer.

14. A method according to claim 11 wherein estimating the minimum luminance received at the display modulation layer involves setting the minimum luminance to a constant value.

15. A method for displaying an image on a display having a light source modulation layer and a display modulation layer, the method comprising:

receiving a frame of image data;

determining light source modulator control values for the light source modulation layer, based at least on the image data;

estimating a minimum and maximum luminance received at the display modulation layer;

extracting a section of a perceptual curve that maps luminance values to display modulator control values, the extracted section of the perceptual curve having luminance values extending between the estimated minimum and maximum luminance;

mapping the luminance values of the extracted section of the perceptual curve to an available range of display modulator control values for the display modulation layer to determine a desired-total response curve;

determining display modulator control values for the display modulation layer based at least on the image data and the desired-total response curve; and displaying the image by outputting the display modulator control values to the display modulation layer and the light source modulator control values to the light source modulation layer;

wherein mapping the extracted section of the perceptual curve to the available range of display modulator control values comprises using downsampling to compress the extracted section of the curve.

16. A method according to claim 15 wherein mapping the extracted section of the perceptual curve to the available range of display modulator control values comprises scaling the desired-total response curve to correspond to display modulator control values in a range of [0,1].

17. A method according to claim 15 comprising representing the perceptual curve as a look up table in memory accessible to the display.

18. A method according to claim 15 wherein the perceptual curve is a DICOM curve.

19. A method according to claim 15 wherein estimating the minimum and maximum luminance, extracting the section of the perceptual curve and mapping the extracted section of the perceptual curve are performed on a plurality of subsets of the frame of image data.

20. A dual modulator display system comprising:

a display having a light source modulation layer and a display modulation layer;

a data store for storing data for a perceptual curve;

a processor connected to receive image data from an image data source, receive data from the data store, and transmit driving control values to the display, the processor configured to display an image on a display having a light source modulation layer and a display modulation layer, the configuration operative to:

receive a frame of image data;

determine light source modulator control values for the light source modulation layer, based at least on the image data;

estimate a minimum and maximum luminance received at the display modulation layer;

extract a section of a perceptual curve that maps luminance values to display modulator control values, the extracted section of the perceptual curve having luminance values extending between the estimated minimum and maximum luminance;

map the luminance values of the extracted section of the perceptual curve to an available range of display modulator control values for the display modulation layer to determine a desired-total response curve;

determine display modulator control values for the display modulation layer based at least on the image data and the desired-total response curve;

display the image by outputting the display modulator control values to the display modulation layer and the light source modulator control values to the light source modulation layer; and obtain calibration data which relates display modulator control values to corresponding output of the display modulation layer;

wherein determined display modulator control values are based at least on the calibration data; and wherein determined display modulator control values comprise an adjusted desired-total response curve based on the calibration data used to obtain an encoding curve which relates input image data values to output display modulator control values; and apply the encoding curve to the image data to obtain the display modulator control values used to display the image.

* * * * *